HANNAH A. NEGUS.
IRONING-TABLE.
No. 176,336.           Patented April 18, 1876.
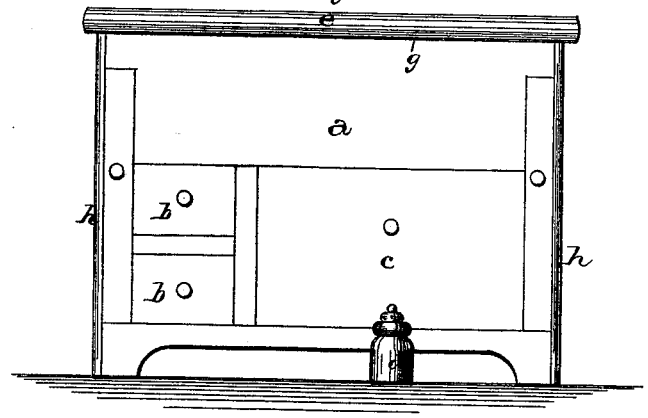
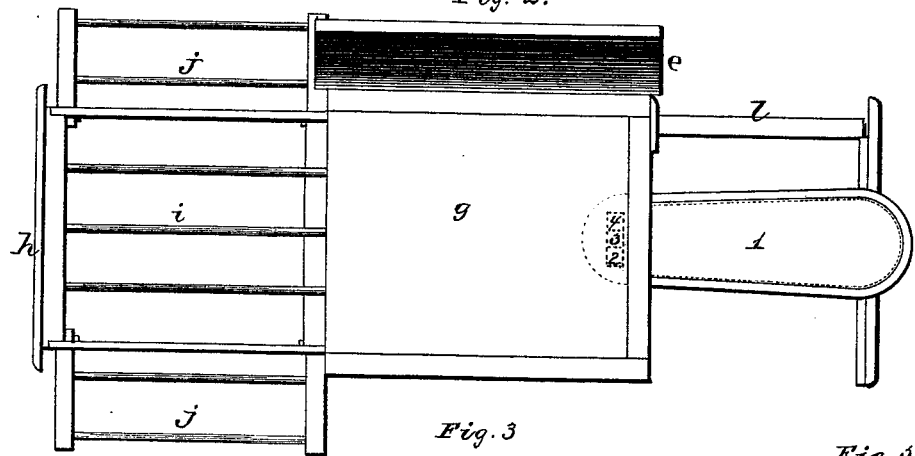
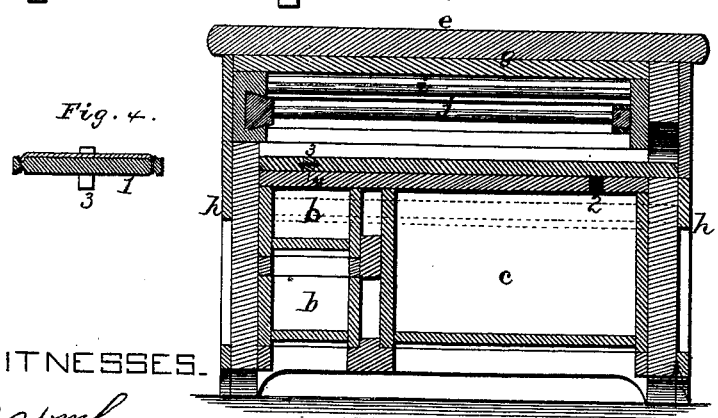
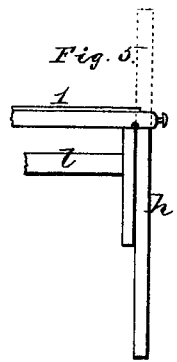
WITNESSES.
J. Wm. Garner
Jno Irwin
INVENTOR.
Mrs. H. A. Negus
per
F. A. Lehmann,
atty

UNITED STATES PATENT OFFICE.

HANNAH A. NEGUS, OF WINTERSET, IOWA.

IMPROVEMENT IN IRONING-TABLES.

Specification forming part of Letters Patent No. 176,336, dated April 18, 1876; application filed September 28, 1875.

*To all whom it may concern:*

Be it known that I, HANNAH A. NEGUS, of Winterset, in the county of Madison and State of Iowa, have invented certain new and useful Improvements in Household Furniture; and I do hereby declare the following to be a full, clear, and exact description of the invention, such as will enable others skilled in the art to which it pertains to make and use it, reference being had to the accompanying drawings, which form part of this specification.

My invention relates to an improvement in household furniture; and it consists in the arrangement and combination of parts, that will be more fully described hereafter, whereby a clothes-rack, ironing-board, ironing-table, molding-board, and a number of drawers are all combined in a single piece of furniture.

The accompanying drawings represent my invention.

$a$ represents a rectangular frame, of any desired size and construction, which is provided with a suitable number of drawers, $b$, for holding groceries, spices, extracts, and other such articles. The large drawer $c$ is for flour, and is provided with a caster, $d$, on its front edge, so that it can be the more easily drawn out, and will be prevented from sagging down and straining the frame. In order to prevent this roller from disfiguring the frame, its head is made ornamental, and a recess is cut in the frame to receive it. The top of the hinged cover $e$ forms an ironing-table, while the top $g$ of the frame, just under this cover, forms a molding-board, upon which to make bread and pastry. To each end of the frame $a$ is attached a molding, $h$, of any design preferred, large enough to cover the whole end of the frame. Secured to the molding at one end is a clothes-rack, $i$, that is made to slide in and out of the frame, the molding moving with it, so as to support its outer end. The inner end of this rack is provided with suitable stops, to prevent it from being withdrawn entirely from the frame, while each of its ends are longitudinally grooved upon its inner side to near their ends, and in these grooves are placed small sliding racks $j$, that can be drawn horizontally out, so as to increase the size of the main rack, as shown. At the other end of the frame there is a similar molding, which is attached to the frame by means of a rod, $l$, and to which rod the molding is hinged. Sliding in and out of the end of the frame is an ironing-board, 1, which is provided with an eccentrically-pivoted catch, 3, near its inner end.

As the board is drawn out, as soon as the catch comes over a slot, 2, in the frame, the longer end of the catch drops into the slot, and the board is prevented from being moved in either direction, in or out.

As the slot is considerably wider than the inner end of the board, by moving the board sidewise the ends of the slot 2 serve to move the catch, so that it closes up in the slot 4 in the board, and thus leaves the board free to be pushed back or taken out entirely.

The top part of the molding is hinged to the lower part, so that it can be turned downward, as shown, and thus the molding is reduced to just the proper height to serve as a support for the outer end of the board.

When the board and molding are closed inward, the upper hinged part of the molding serves to hide the slot in the end of the frame into which the board is pushed.

When it is desired to slip skirts over the end of the board, the molding or support can be swung back by means of its hinge, the skirt put in place, and the support moved back in place again.

Around the edges of the ironing-board are made a series of holes, and in both sides of the board parallel with the edges are cut grooves.

The edges of the covering-cloth are folded under, pressed down into the grooves, and then sewed through the holes.

A board covered in this manner is not only neater, but it requires much less cloth than when covered in the usual manner.

Having thus described my invention, I claim—

1. The ironing-board 1 and eccentrically-pivoted catch 3, in combination with the frame $a$, having the slot 2, in which the end of the catch drops, as set forth.

2. The combination of the molding $h$ with the clothes-rack $i$ and smaller racks $j$, moving at right angles thereto, substantially as specified.

3. The combination of the frame $a$, drawers $b$ $c$, ironing-table $e$, molding-board $g$, racks, and ironing-boards, as shown and described.

In testimony that I claim the foregoing I have hereunto set my hand this 17th day of September, 1875.

HANNAH A. NEGUS.

Witnesses:
T. C. GILPIN,
E. O. BURT.